United States Patent
Sugawara et al.

(10) Patent No.: US 9,455,092 B2
(45) Date of Patent: Sep. 27, 2016

(54) ELECTRIC CONDUCTIVE POLYMER SUSPENSION AND METHOD FOR PRODUCING THE SAME, ELECTRIC CONDUCTIVE POLYMER MATERIAL, AND ELECTROLYTIC CAPACITOR AND METHOD FOR PRODUCING THE SAME

(75) Inventors: Yasuhisa Sugawara, Miyagi (JP); Tomoki Nobuta, Miyagi (JP); Satoshi Suzuki, Miyagi (JP); Yasuhiro Tomioka, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 280 days.

(21) Appl. No.: 14/118,100

(22) PCT Filed: May 17, 2012

(86) PCT No.: PCT/JP2012/062603
§ 371 (c)(1),
(2), (4) Date: Nov. 15, 2013

(87) PCT Pub. No.: WO2012/157693
PCT Pub. Date: Nov. 22, 2012

(65) Prior Publication Data
US 2014/0211372 A1 Jul. 31, 2014

(30) Foreign Application Priority Data
May 17, 2011 (JP) ................. 2011-110636

(51) Int. Cl.
*H01G 9/15* (2006.01)
*H01G 9/028* (2006.01)
(Continued)

(52) U.S. Cl.
CPC ............ *H01G 9/15* (2013.01); *C08G 73/0266* (2013.01); *C08L 65/00* (2013.01); *C08L 77/00* (2013.01);
(Continued)

(58) Field of Classification Search
CPC .......... H01G 9/02; H01G 9/025; H01G 9/15; H01G 9/00
USPC ................................. 361/523, 525, 528–529
See application file for complete search history.

(56) References Cited

U.S. PATENT DOCUMENTS

2005/0218381 A1   10/2005   Maruyama et al.
2006/0076541 A1   4/2006    Yoshida et al.
(Continued)

FOREIGN PATENT DOCUMENTS

CN   101580659 A   11/2009
CN   101583671 A   11/2009
(Continued)

OTHER PUBLICATIONS

Office Action mailed Mar. 12, 2013 in related Japanese application No. 2011-110636 with partial English-language translation (7 pgs.).
(Continued)

*Primary Examiner* — Nguyen Ha
(74) *Attorney, Agent, or Firm* — Foley & Lardner LLP

(57) ABSTRACT

An electric conductive polymer suspension is produced by performing chemical oxidative polymerization of a monomer for providing an electric conductive polymer by using an oxidant in a solvent containing an organic acid or a salt thereof as a dopant to form an electric conductive polymer, recovering the electric conductive polymer, allowing an oxidant to act on the electric conductive polymer in an aqueous solvent containing a polyacid, and further mixing a dispersant with a branched structure and then pulverizing the electric conductive polymer. According to the electric conductive polymer suspension, an organic material high in conductivity, and excellent in adhesiveness to a substrate and water resistance, and a method for producing the material, as well as an electrolytic capacitor and a method for producing the capacitor can be provided.

10 Claims, 1 Drawing Sheet

(51) Int. Cl.
- *H01B 1/12* (2006.01)
- *C08G 73/02* (2006.01)
- *C08L 77/00* (2006.01)
- *C08L 65/00* (2006.01)
- *C09D 125/18* (2006.01)
- *H01G 11/48* (2013.01)
- *H01G 11/56* (2013.01)
- *H01B 1/20* (2006.01)

(52) U.S. Cl.
CPC ............ *C09D 125/18* (2013.01); *H01B 1/127* (2013.01); *H01B 1/20* (2013.01); *H01G 9/028* (2013.01); *H01G 11/48* (2013.01); *H01G 11/56* (2013.01); *C08G 2261/3221* (2013.01); *C08G 2261/3223* (2013.01); *C08G 2261/794* (2013.01); *Y02E 60/13* (2013.01); *Y10T 29/417* (2015.01)

(56) References Cited

U.S. PATENT DOCUMENTS

| | | | | |
|---|---|---|---|---|
| 2010/0091432 | A1* | 4/2010 | Sugawara | C08L 25/18 361/525 |
| 2010/0227950 | A1 | 9/2010 | Nguyen et al. | |
| 2011/0001720 | A1 | 1/2011 | Asai et al. | |
| 2011/0019340 | A1* | 1/2011 | Nobuta | C08K 5/053 361/525 |

FOREIGN PATENT DOCUMENTS

| | | |
|---|---|---|
| JP | 07-090060 A | 4/1995 |
| JP | 7-090066 A | 4/1995 |
| JP | 11-292957 A | 10/1999 |
| JP | 2002060736 A | 2/2002 |
| JP | 2002-201284 A | 7/2002 |
| JP | 2002-305086 A | 10/2002 |
| JP | 2004-059666 A | 2/2004 |
| JP | 2004-305086 A | 11/2004 |
| JP | 2007-254730 A | 10/2007 |
| JP | 2008-045116 A | 2/2008 |
| JP | 2009-001624 A | 1/2009 |
| JP | 2010-500443 A | 1/2010 |
| JP | 2010-270205 A | 12/2010 |
| JP | 2011-086393 A | 4/2011 |
| WO | WO 2008/088028 A1 | 7/2008 |
| WO | WO 2010/025889 A1 | 3/2010 |
| WO | WO 2010/090206 A1 | 8/2010 |

OTHER PUBLICATIONS

Office Action mailed Apr. 8, 2015 in related Chinese application No. 201280023696.9 with English-language translation (15 pgs.).

Office Action mailed May 20, 2015 in related German application No. 11 2012 002 130.4 with English-language translation (11 pgs.).

Office Action mailed Sep. 25, 2015 in related Chinese Application No. 201280023696.9 with English-language translation (23 pgs.).

\* cited by examiner

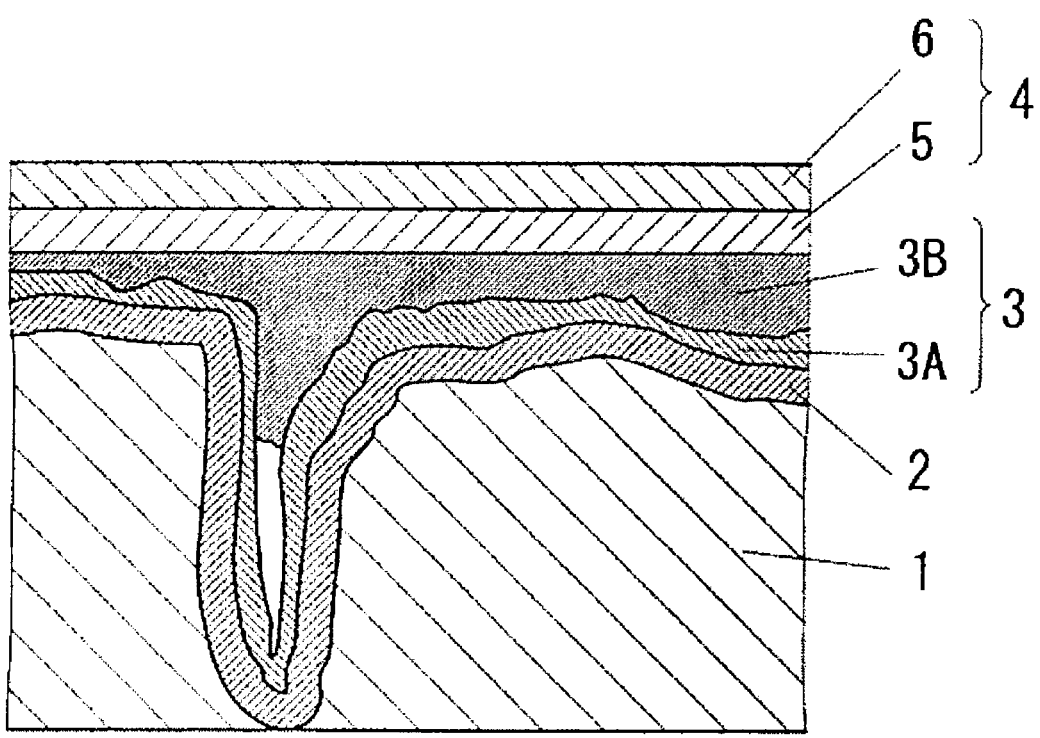

ELECTRIC CONDUCTIVE POLYMER SUSPENSION AND METHOD FOR PRODUCING THE SAME, ELECTRIC CONDUCTIVE POLYMER MATERIAL, AND ELECTROLYTIC CAPACITOR AND METHOD FOR PRODUCING THE SAME

This application is the National Phase of PCT/JP2012/062603, filed May 17, 2012, which claims priority to Japanese Application No. 2011-110636, filed May 17, 2011, the disclosures of which are hereby incorporated by reference in their entirety.

TECHNICAL FIELD

Embodiments according to the present invention relate to an electric conductive polymer suspension and a method for producing the suspension, an electric conductive polymer material obtained from the suspension, and an electrolytic capacitor using the material and a method for producing the capacitor.

BACKGROUND ART

Electric conductive polymer materials are used for electrodes of capacitors, electrodes of dye-sensitized solar cells, electrodes of electroluminescence displays. As such electric conductive polymer materials, polymer materials obtained by polymerizing a monomer(s) such as pyrrole, thiophene, 3,4-ethylenedioxy thiophene, aniline are known, and related techniques have been disclosed in Patent Literatures 1 to 3.

Patent Literature 1 relates to a polythiophene solution (dispersion), a method for producing the solution and use of a salt for an antistatic treatment of a plastic molding. It concretely describes a polythiophene dispersion, in which the polythiophene has a structure unit of 3,4-dialkoxythiophene, in the presence of a polyanion. It describes that the polythiophene dispersion is produced by oxidative polymerization of 3,4-dialkoxythiophene at a temperature of 0 to 100° C. in the presence of a polyanion.

Patent Literature 2 relates to an aqueous dispersion of a composite of poly(3,4-dialkoxythiophene) with a polyanion, and a method for producing the dispersion, as well as a coating composition comprising the aqueous dispersion, and a coated substrate having a transparent electric conductive film coated with the composition. It concretely describes an aqueous dispersion of a composite of poly (3,4-dialkoxythiophene) with a polyanion, which is produced by polymerizing 3,4-dialkoxythiophene by using peroxodisulfuric acid as an oxidant in an aqueous solvent in the presence of a polyanion.

Patent Literature 3 relates to a dispersion liquid including polystyrene sulfonic acid and 3,4-polyethylenedioxythiophene, in which the particle sizes of at least 90% by weight of particles are smaller than 50 nm, and an electroluminescent device including a hole-injection layer made from the dispersion liquid. It describes that the resistance of 3,4-polyethylenedioxythiophene can be increased without losing a desired hole-injection action by making the particle sizes of at least 90% by weight of particles smaller than 50 nm, in the dispersion liquid including polystyrene sulfonic acid and 3,4-polyethylenedioxythiophene.

REFERENCE LIST

Patent Literatures

Patent Literature 1: JP07-090060A
Patent Literature 2: JP2004-059666A
Patent Literature 3: JP2002-305086A

SUMMARY OF INVENTION

Technical Problem

However, in the method of oxidative chemical polymerization of 3,4-dialkoxythiophene in the presence of a polyanion acting as a dopant, since it is difficult to control the doping rate, the polyanion, which neither is used as dopant nor contribute to conductivity, is present in an excess amount. Accordingly, It is difficult to say that the methods described in Patent Literatures 1 and 2 are enough as a method for producing a polymer material with a high conductivity.

In addition, the surface resistivity of an antistatic material is generally classified to be $10^5$ to $10^{14}$ $\Omega$/sq and the conductivity (less than $10^5$ $\Omega$/sq) is too high and severe electrostatic discharge may occur. It is thus considered that such an antistatic material does not have a conductivity to quickly dissipate the static electricity of a charged object. Even if the antistatic material has a sufficient conductivity as an antistatic material, it is difficult to sufficiently satisfy the requirement for low ESR in terms of conductivity when such an antistatic material is used for, for example, an electrode of a capacitor. Additionally, an electric conductive polymer material including a polyanion in an excess amount is very poor in water resistance, and, thus, a capacitor using such an electric conductive polymer material for an electrolyte is disadvantageous in that it is inferior in reliability, in particular properties under a high humidity atmosphere.

In the method described in Patent Literature 3, the particle sizes of 90% by weight of polystyrene sulfonic acid particles and 3,4-polyethylenedioxythiophene particles in the dispersion liquid are set to 50 nm or less in order to increase the resistance so that the dispersion liquid is suitable for a hole-injection layer of an electroluminescent device. Therefore, a coating agent made from the dispersion liquid is low in conductivity (>5000 $\Omega$cm; less than $2\times10^{-4}$ S/cm). Thus, as with Patent Literatures 1 and 2, it is difficult to sufficiently satisfy the requirement for low ESR in terms of conductivity when such a coating agent is used for, for example, an electrode of a capacitor.

An object of embodiments according to the present invention is to solve the above problems, and to provide an electric conductive polymer suspension for providing a polymer material high in conductivity and a method for producing the suspension, as well as to provide an electrolytic capacitor low in ESR and excellent in reliability, in particular, in properties under a high humidity atmosphere, and a method for producing the capacitor.

Means for Solving the Problems

An embodiment according to the present invention relates to an electric conductive polymer suspension containing an electric conductive polymer, at least one polyanion, and at least one dispersant with a branched structure.

An embodiment according to the present invention relates to the electric conductive polymer suspension, wherein the particle size of the electric conductive polymer is partially or entirely 100 nm or less.

An embodiment according to the present invention relates to a method for producing an electric conductive polymer suspension, comprising a first step of performing chemical oxidative polymerization of a monomer for providing an electric conductive polymer by using an oxidant in a solvent containing an organic acid or a salt thereof as a dopant to provide an electric conductive polymer-containing mixture, a second step of recovering the electric conductive polymer from the mixture, a third step of mixing an oxidant with the electric conductive polymer in an aqueous solvent containing a polyanion, and a fourth step of mixing a dispersant with a branched structure and then, pulverizing the electric conductive polymer.

An embodiment according to the present invention relates to an electric conductive polymer suspension obtained by the above method.

An embodiment according to the present invention relates to an electric conductive polymer material formed by drying the above electric conductive polymer suspension to remove the solvent.

An embodiment according to the present invention relates to an electrolytic capacitor including an electrolyte layer including the above electric conductive polymer suspension or the above electric conductive polymer material.

An embodiment according to the present invention relates to a method for producing an electrolytic capacitor, including a step of forming a dielectric layer on the surface of an anode conductor including a valve metal, and a step of coating or impregnating the dielectric layer with the above electric conductive polymer suspension to form an electrolyte layer on the dielectric layer.

An embodiment according to the present invention relates to a method for producing an electrolytic capacitor, comprising a step of forming a dielectric layer on the surface of an anode conductor including a valve metal, a step of performing chemical oxidative polymerization or electropolymerization of a monomer for providing a first electric conductive polymer compound to form a first electric conductive polymer compound layer on the dielectric layer, and a step of coating or impregnating the first electric conductive polymer compound layer with the above electric conductive polymer suspension to form a second electric conductive polymer compound layer on the first electric conductive polymer compound layer.

Effects of the Invention

According to the embodiments according to the present invention, an electric conductive polymer suspension for providing an organic material high in conductivity, and excellent in adhesiveness to a substrate and water resistance can be obtained. In addition, according to the embodiments according to the present invention, an electrolytic capacitor low in ESR, and excellent in reliability, in particular, in properties under a high humidity atmosphere can be obtained.

BRIEF DESCRIPTION OF DRAWING

FIG. 1 is a schematic cross-sectional view illustrating a structure of a solid electrolytic capacitor according to the present embodiment.

DESCRIPTION OF EMBODIMENTS

Hereinafter, an electric conductive polymer suspension and an electric conductive polymer material obtained from the suspension, a method for producing the electric conductive polymer suspension, and an electrolytic capacitor using the electric conductive polymer material and a method for producing the capacitor, according to the present embodiment, will be described in detail.

<Electric Conductive Polymer Suspension and Electric Conductive Organic Material>

The electric conductive polymer suspension according to the present embodiment contains an electric conductive polymer, at least one polyanion, and at least one dispersant with a branched structure.

According to the above composition, the electric conductive polymer suspension is excellent in dispersing stability of particles contained therein. Therefore, a polyanion, which is not used as dopant and, thus, does not contribute to conductivity, can be reduced with respect to the electric conductive polymer. Therefore, an electric conductive polymer material obtained from the electric conductive polymer suspension can be high in conductivity. In addition, since the electric conductive polymer suspension does not contain a polyanion in an excess amount, the electric conductive polymer material obtained from the electric conductive polymer suspension is excellent in water resistance, and a capacitor using the electric conductive polymer material for an electrolyte is excellent in reliability, in particular, in properties under a high humidity atmosphere.

In order to achieve the above effects, a synergistic effect between the polyanion and the dispersant with a branched structure is required. In the case of the single use of the polyanion, there is a case where an electric conductive polymer material obtained may be low in conductivity and inferior in water resistance due to the above reason. In the case of the single use of the dispersant with a branched structure, since no polyanion with which an electric conductive polymer can be doped is present, an electric conductive organic material obtained is low in conductivity. In addition, in the case of the polyanion and a dispersant with a straight chain structure, since there is a case where the desired dispersing stability of particles in the electric conductive polymer suspension may not be obtained, the polyanion and the dispersant with a straight chain structure are required to be combined in large amounts with respect to the electric conductive polymer, and thus there is a case where an electric conductive polymer material obtained may be low in conductivity and inferior in water resistance.

The above effects are, in particular, remarkably exerted in the case where the electric conductive polymer suspension contains an electric conductive polymer with a particle size of 100 nm or less, namely, in the case where the particle sizes of the electric conductive polymer contained in the electric conductive polymer suspension are partially or entirely 100 nm or less. Usually, when the particle sizes of particles in the electric conductive polymer suspension are partially or entirely 100 nm or less, the polyanion is required to be contained in a larger amount with respect to the electric conductive polymer in order to stabilize the dispersing of particles in the electric conductive polymer suspension. Thus an electric conductive organic material obtained from the electric conductive polymer suspension is particularly low in conductivity. However, according to the above composition, even when the particle sizes of particles in the electric conductive polymer suspension are partially or entirely 100 nm or less, the polyanion is not required to be contained in a larger amount, and, thus, an electric conductive organic material obtained from the electric conductive polymer suspension is high in conductivity.

The electric conductive polymer suspension, in which the particle sizes of the electric conductive polymer are partially or entirely 100 nm or less, is suitable for forming an electric conductive polymer material inside of pores in a porous material of an anode conductor comprising a valve metal with an average pore size of 1000 nm or less. The electric conductive polymer suspension is particularly preferable when the electric conductive polymer material is high in conductivity.

The average particle size of the electric conductive polymer (particle) contained in the electric conductive polymer suspension preferably ranges from 1 to 1000 nm, and the electric conductive polymer with a particle size of 100 nm or less is more preferably contained therein, as described above.

As the electric conductive polymer contained in the electric conductive polymer suspension, an electric conductive organic polymer is preferable as a polymer comprising at least one of pyrrole, thiophene, and derivatives thereof. The molecular weight and properties of the electric conductive polymer can be selected depending on the use thereof. When the electric conductive polymer is used for an electrolytic capacitor, the molecular weight and properties within the ranges suitable for the composition of the electrolytic capacitor may be selected. As the electric conductive polymer, in particular, poly (3,4-ethylenedioxy thiophene) with a structure unit represented by the following formula (1), or a derivative thereof is preferable. The electric conductive polymer may be a homopolymer or a copolymer, and one or two or more thereof may be used.

[Formula 1]

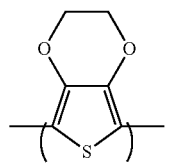

(1)

The content of the electric conductive polymer in the electric conductive polymer suspension is preferably 0.1 to 30 parts by weight and more preferably 0.5 to 20 parts by weight with respect to 100 parts by weight of water serving as a solvent.

The electric conductive polymer suspension contains a polyanion. Examples of the polyanion include polycarboxylic acids such as polyacrylic acid, polymethacrylic acid and polymaleic acid; polysulfonic acids such as polyvinyl sulfonic acid and polystyrene sulfonic acid; and copolymers comprising at least one of these structure units. Among them, a polystyrene sulfonic acid comprising a structure unit represented by the following (2) is preferable. One or two or more of such polyanions may be contained.

[Formula 2]

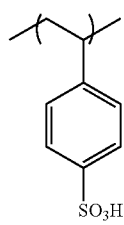

(2)

The weight average molecular weight of the polyanion is preferably 2,000 to 500,000 and more preferably 10,000 to 200,000.

The electric conductive polymer suspension preferably contains a dispersant with a branched structure together with the polyanion. One or two or more dispersants with a branched structure may be contained.

The dispersant with a branched structure is more preferably an organic polymer dispersant with a structure bearing an adsorption group for adsorption to the electric conductive polymer in a main chain, and bearing one or more hydrophilic and/or hydrophobic side chains.

Examples of the main chain of the dispersant include polyethylene, polyolefin, polystyrene, polyester, polyurethane, polyamide, polyvinyl acetate, an acrylic resin, and copolymers including two or more of such structure units.

Examples of the adsorption group in the main chain of the dispersant include a carboxyl group, a sulfo group, a phosphate group, and an amino group. A carboxyl group and a sulfo group are particularly desirable from the viewpoint of a high adsorptive property to the electric conductive polymer.

Examples of the side chain of the dispersant include polyether, polyvinyl alcohol and polyvinylpyrrolidone which are hydrophilic, and polyethylene, polyolefin, polystyrene, polyester, polyurethane, polyamide, polyvinyl acetate and an acrylic resin which are hydrophobic. The dispersant may contain one side chain, but it particularly preferably contains a plurality of side chains from the viewpoint of achieving higher steric hindrance to thereby increase an effect of improving the dispersibility of particles. One or two or more side chains may be present. The dispersant particularly preferably contains both of a hydrophilic side chain(s) and a hydrophobic side chain(s) from the viewpoint of increasing not only the stability of particles in the electric conductive polymer suspension, but also the strength of the electric conductive polymer material.

The dispersant with a branched structure used can be selected from the dispersants with a branched structure as described above, among dispersants utilized as dispersants of solid particles such as pigments, and, for example, a dispersant commercially available as "DISPERBYK-190" for use in each Example described later can be suitably utilized.

"DISPERBYK-190" includes an acrylic resin as a main chain, and the main chain bears a carboxyl group as the adsorption group. "DISPERBYK-190" bears polyether which is hydrophilic and polystyrene which is hydrophobic, as the plurality of side chains, and is a dispersant with a branched structure.

As for the preferable contents of the polyanion and the dispersant with a branched structure in the electric conductive polymer suspension, the content of the polyanion is 10 to 200 parts by weight and the content of the dispersant with a branched structure is 1 to 120 parts by weight with respect to 100 parts by weight of the electric conductive polymer. More preferably, the content of the polyanion is 50 to 150 parts by weight and the content of the dispersant with a branched structure is 1 to 50 parts by weight with respect to 100 parts by weight of the electric conductive polymer.

The electric conductive polymer suspension preferably contains at least one water-soluble binder. Examples of the water-soluble binder include polyvinyl alcohol, polyacrylic acid, polyacrylamide, polyvinylpyrrolidone, polyester, polyurethane, polyamide, and copolymers including two or more of these structure units, and the water-soluble binder utilized can be selected among binders utilized for a coating polymer suspension. Among them, it has been found that a polyester or a polyamide, which is modified to be water-soluble by addition of a carboxyl group or sulfo group thereto or copolymerization with polyethylene glycol, does not impair the dispersing stability of particles in the electric conductive polymer suspension, and mostly does not impair the conductivity of the electric conductive organic material obtained from the electric conductive polymer suspension.

The content of the water-soluble binder in the electric conductive polymer suspension is 10 to 400 parts by weight with respect to 100 parts by weight of the electric conductive polymer.

The water-soluble binder is added to thereby improve adhesiveness to a substrate. The electric conductive polymer suspension may contain, together with the water-soluble binder, a crosslinking agent for crosslinking the water-soluble binder.

The electric conductive polymer suspension is preferably mixed with erythritol and/or pentaerythritol for the purpose of improving properties of the electric conductive polymer material, such as conductivity, density, and strength.

Erythritol is preferable because it is higher in crystallinity than polyhydric alcohols such as sorbitol and maltitol, and thus is low in hygroscopic property and easy in handling. In addition, erythritol is known to be a food additive for use as a sweetener, is also excellent in safety and stability. Erythritol is advantageous in that the solubility thereof in water is higher than those of non-aqueous solvents such as ethylene glycol and glycerin by several times and thus the amount thereof added is designed by a high degree of freedom.

Pentaerythritol is characterized in gradually sublimation along with heating and dehydration by heating at a temperature equal to or higher than the melting point thereof for polymerization. As a result, an advantage of changing physical properties of the electric conductive polymer material to improve density and strength can be obtained. Therefore, it is difficult to obtain such reactivity by the structure such as erythritol and sorbitol.

Erythritol possesses a higher effect of improving conductivity, and pentaerythritol possesses a higher effect of improving properties such as density and strength.

At least one of erythritol and pentaerythritol is mixed with the electric conductive polymer suspension in a concentration equal to or higher than the concentration of the polymer in the electric conductive polymer suspension to thereby exert the effects. Herein, the upper limit concentration of the amount added is not particularly limited as long as erythritol and pentaerythritol are dissolved in the electric conductive polymer suspension.

The electric conductive polymer material according to the present embodiment is obtained by drying the electric conductive polymer suspension to remove the solvent, and is excellent in adhesiveness to a substrate and water resistance, and high in conductivity. The drying temperature for removing the solvent is not particularly limited as long as it is equal to or lower than the decomposition temperature of the electric conductive polymer, but is preferably 300° C. or lower.

<Method for Producing Electric Conductive Polymer Suspension>

The method for producing an electric conductive polymer suspension according to the present embodiment comprises the following steps.

(First Step)

In the present embodiment, chemical oxidative polymerization of a monomer for providing an electric conductive polymer is first performed by using an oxidant in a solvent containing an organic acid or a salt thereof as a dopant to provide an electric conductive polymer-containing mixture. In a first step, an electric conductive polymer with a high degree of polymerization and a high degree of crystallization can be provided.

Examples of the dopant include alkyl sulfonic acid, benzenesulfonic acid, naphthalenesulfonic acid, anthraquinone sulfonic acid, camphorsulfonic acid, and derivatives thereof, as well as iron (III) salts thereof. Such sulfonic acids may be each a monosulfonic acid, disulfonic acid or trisulfonic acid. Examples of the derivative of alkyl sulfonic acid include 2-acrylamide-2-methylpropanesulfonic acid. Examples of the derivative of benzenesulfonic acid include phenolsulfonic acid, styrenesulfonic acid, toluenesulfonic acid, and dodecylbenzenesulfonic acid. Examples of the derivative of naphthalenesulfonic acid include 1-naphthalenesulfonic acid, 2-naphthalenesulfonic acid, 1,3-naphthalenedisulfonic acid, 1,3,6-naphthalenetrisulfonic acid, and 6-ethyl-1-naphthalenesulfonic acid. Examples of the derivative of anthraquinone sulfonic acid include anthraquinone-1-sulfonic acid, anthraquinone-2-sulfonic acid, anthraquinone-2,6-disulfonic acid, and 2-methylanthraquinone-6-sulfonic acid. Among them, 1-naphthalenesulfonic acid, 2-naphthalenesulfonic acid, 1,3,6-naphthalenetrisulfonic acid, anthraquinone disulfonic acid, p-toluenesulfonic acid, camphorsulfonic acid and an iron (III) salt thereof are preferable. Camphorsulfonic acid is further preferable because of its large influence on high crystallization of the polymer. Camphorsulfonic acid may be optically active. One or two or more of such dopants may be used.

The amount of the dopant used is not particularly limited because the dopant can be removed in a second step even if being excess, but is preferably 1 to 100 parts by weight and more preferably 1 to 50 parts by weight with respect to 1 part by weight of the monomer.

As the solvent, any of water, an organic solvent, and a water-mixed organic solvent may be used, and a solvent good in compatibility with the monomer is preferably selected. A solvent also good in compatibility with the dopant and the oxidant are particularly preferably selected. Examples of the organic solvent include alcohol solvents such as methanol, ethanol and propanol; and low-polarity solvents such as acetonitrile, acetone and dimethyl sulfoxide. One or two or more of such organic solvents may be used. Among them, ethanol, or a mixed solvent of ethanol and water is preferable.

The electric conductive polymer is preferably a polymer including at least one of pyrrole, thiophene, and derivatives thereof.

The monomer for providing an electric conductive polymer may be selected depending on the objective electric conductive polymer. One or two or more monomers may be used.

Polypyrrole and a derivative thereof are obtained by polymerizing the corresponding pyrrole or a derivative of the pyrrole. Examples of the derivative of the pyrrole include 3-alkylpyrroles such as 3-hexylpyrrole, 3,4-dialkylpyrroles such as 3,4-dihexylpyrrole, 3-alkoxypyrroles such as 3-methoxypyrrole, and 3,4-dimethoxypyrroles such as 3,4-dimethoxypyrrole.

Polythiophene and a derivative thereof are obtained by polymerizing the corresponding thiophene or a derivative of the thiophene. Examples of the derivative of the thiophene includes 3,4-ethylenedioxy thiophene and a derivative thereof, 3-alkylthiophenes such as 3-hexylthiophene, and 3-alkoxythiophenes such as 3-methoxythiophene. Examples of the derivative of 3,4-ethylenedioxy thiophene include 3,4-(1-alkyl)ethylenedioxy thiophenes such as 3,4-(1-hexyl) ethylenedioxy thiophene.

Among them, poly (3,4-ethylenedioxy thiophene) represented by the following formula (3) or a derivative thereof is preferable.

[Formula 3]

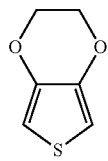

(3)

The concentration of the monomer in the solvent is preferably 0.1 to 50% by weight and more preferably 0.5 to 30% by weight.

The oxidant is not particularly limited, and examples of the oxidant that can be used include iron (III) salts of an inorganic acid such as iron (III) chloride hexahydrate, anhydrous iron (III) chloride, iron (III) nitrate nonahydrate, anhydrous ferric nitrate, iron (III) sulfate n-hydrate (n=3 to 12), ammonium iron (III) sulfate dodecahydrate, iron (III) perchlorate n-hydrate (n=1, 6) and iron (III) tetrafluoroborate; copper (II) salts of an inorganic acid such as copper (II) chloride, copper (II) sulfate and copper (II) tetrafluoroborate; nitrosonium tetrafluoroborate; persulfates such as ammonium persulfate, sodium persulfate and potassium persulfate; periodates such as potassium periodate; hydrogen peroxide, ozone, potassium hexacyanoferrate (III), tetraammonium cerium (IV) sulfate dihydrate, bromine and iodine; and iron (III) salts of an organic acid such as iron (III) p-toluenesulfonate. Among them, iron (III) salts of an inorganic acid or an organic acid, or persulfates are preferable, ammonium persulfate or iron (III) p-toluenesulfonate is more preferable. Iron (III) p-toluenesulfonate is further preferable because it has also the function as the dopant. One or two or more of such oxidants may be used.

The amount of the oxidant used is not particularly limited because the dopant can be removed in a second step even if being excess. However, in order to obtain a polymer with a high conductivity by the reaction under a milder oxidation atmosphere, the amount of the oxidant added is preferably 0.5 to 100 parts by weight and more preferably 1 to 50 parts by weight with respect to 1 part by weight of the monomer.

The reaction temperature of the chemical oxidative polymerization is not particularly limited, but it is generally about the reflux temperature of the solvent used, and is preferably 0 to 100° C. and more preferably 10 to 50° C. If the reaction temperature is not adequate, there is a case where conductivity can be impaired. The reaction time of the chemical oxidative polymerization depends on the type and amount of the oxidant charged, the reaction temperature or the stirring condition. The reaction time may be about 5 to 100 hours.

The first step is preferably performed in the presence of a substance having a surface-active action. As the substance having a surface-active action, an anion surfactant, a cation surfactant, or an amphoteric surfactant can be used. Dodecylbenzenesulfonic acid or polyethylene glycol is suitable.

(Second Step)

In the present embodiment, the electric conductive polymer is recovered from the mixture obtained in the first step. Specifically, the dopant, the unreacted monomer, and the remaining metal ion and anion derived from the oxidant are removed by separating the electric conductive polymer from the reaction liquid containing the electric conductive polymer obtained by the chemical oxidative polymerization, and, then, washing the electric conductive polymer. Sufficient purification treatment can be carried out by the second step to provide an electric conductive polymer with high purity.

Examples of a method of separating the electric conductive polymer from the reaction liquid include a filtration method and a centrifugal method.

As the washing solvent, a solvent capable of dissolving the monomer and/or oxidant without dissolving the electric conductive polymer is preferably used. Examples of the washing solvent include water, and alcohol solvents such as methanol, ethanol and propanol. One or two or more of such washing solvents may be used. The extent of washing can be confirmed by measuring the pH of the washing solvent after the washing or by performing colorimetric observation.

Furthermore, the electric conductive polymer is preferably washed with hot water and/or is subjected to a heat treatment, because a metal component derived from the oxidant can be removed at a higher level. The temperature of the heat treatment is not particularly limited as long as it is equal to or lower than the decomposition temperature of the electric conductive polymer. The heat treatment is preferably performed less than 300° C. In addition, an ion-exchange treatment using an ion-exchange resin is also efficiently performed as a method for removing the metal ion and anion derived from the oxidant.

An impurity(ies) contained in the electric conductive polymer can be quantitatively analyzed by ICP emission analysis or ion chromatography.

(Third Step)

In the present embodiment, the electric conductive polymer recovered in the second step is mixed with an oxidant in an aqueous solvent containing a polyanion. In a third step, by allowing the polyanion as a dispersant and the oxidant to act on the electric conductive polymer, an electric conductive polymer suspension is obtained in which the dispersibility of the electric conductive polymer is good. As a dispersing mechanism, the doping action of the anion due to the polyanion is at least considered.

As the polyanion, the above-described polyanion can be used. In particular, polystyrene sulfonic acid is preferable. The weight average molecular weight of the polyanion is preferably 2,000 to 500,000 and more preferably 10,000 to 200,000.

The amount of the polyanion used is preferably 10 to 200 parts by weight and more preferably 50 to 150 parts by weight with respect to 100 parts by weight of the electric conductive polymer obtained in the second step.

As the oxidant, the same oxidant as the oxidant used in the first step can be used, and in particular, ammonium persulfate or hydrogen peroxide is preferable.

The amount of the oxidant used is preferably 10 to 500 parts by weight and more preferably 50 to 300 parts by weight with respect to 100 parts by weight of the electric conductive polymer obtained in the second step.

The aqueous solvent is preferably water, but a water-soluble organic solvent may be added thereto without any problem. As the water-soluble organic solvent, one can be selected and used which is suitable for an oxidation reaction when being added to water for use. In addition to such requirements, when the mixed liquid obtained in the third step is used for the fourth step as it is, an organic solvent, that can be utilized as the solvent (liquid medium) of the electric conductive polymer suspension to be finally obtained, can be preferably selected and used. Examples of such an organic solvent include alcohol solvents such as methanol, ethanol and propanol; and low-polarity solvents such as acetonitrile, acetone and dimethyl sulfoxide. One or two or more of such organic solvents may be used.

The reaction temperature in the third step is not particularly limited, but it is preferably 0 to 100° C. and more preferably 10 to 50° C. The reaction time is not particularly limited, but it is about 5 to 100 hours. In addition, the above-described ion-exchange treatment is preferably performed after the third step.

(Fourth Step)

In the present embodiment, after the dispersant with a branched structure is mixed, the electric conductive polymer is pulverized. After the dispersant with a branched structure is mixed, the electric conductive polymer is pulverized, thereby making it possible to provide an electric conductive polymer suspension with a high dispersing stability. The pulverizing in a fourth step enables to at least partially pulverize the electric conductive polymer, namely, also enables to partially or entirely pulverize the electric conductive polymer to 100 nm or less.

The amount of the dispersant with a branched structure used is preferably 1 to 120 parts by weight and more preferably 1 to 50 parts by weight with respect to 100 parts by weight of the electric conductive polymer obtained in the second step.

One or more water-soluble binders are preferably mixed during or after the fourth step. As the water-soluble binder, the above-described binder can be used. Among them, polyester or polyamide modified to be water-soluble by adding a carboxyl group or sulfo group is particularly preferable.

The content of the water-soluble binder in the electric conductive polymer suspension is 10 to 400 parts by weight with respect to 100 parts by weight of the electric conductive polymer.

Erythritol and/or pentaerythritol can be preferably mixed during or after the fourth step. As for the amount of erythritol and/or pentaerythritol added, erythritol and/or pentaerythritol can be mixed in a concentration equal to or higher than the concentration of the polymer in the electric conductive polymer suspension, thereby exerting the desired effects. The upper limit concentration of the amount added is not particularly limited as long as erythritol and/or pentaerythritol can be dissolved in the electric conductive polymer suspension.

The water content, in the electric conductive polymer suspension thus obtained is preferably 50% by weight or more.

<Electrolytic Capacitor and Method for Producing the Same>

The electrolytic capacitor according to the present embodiment comprises the electric conductive polymer material as an electrolyte layer, which is obtained from the above electric conductive polymer suspension. The electrolyte layer is preferably in the form of solid. The electrolytic capacitor according to the present embodiment is low in ESR because a material for forming an electrolyte is high in conductivity. Furthermore, a polymer material high in degree of crystallization is also high in oxygen barrier property correlating with the high degree of crystallization, and is also excellent in adhesiveness to a substrate due to a binder effect. As a result, the reliability of the electrolytic capacitor is sufficiently expected to be improved.

FIG. 1 illustrates a schematic cross-sectional view illustrating a structure of a solid electrolytic capacitor according to the present embodiment. The electrolytic capacitor is provided with a structure in which a dielectric layer 2, a solid electrolyte layer 3 and a cathode conductor 4 are formed on an anode conductor 1 in this order.

The anode conductor 1 is formed of a plate, a foil or a wire of a valve metal; a sintered body including fine particles of a valve metal; or a porous metal subjected to an area enlargement treatment by etching. Examples of the valve metal include tantalum, aluminum, titanium, niobium, zirconium, and alloys thereof. Among them, at least one valve metal selected from aluminum, tantalum and niobium is particularly preferable.

The dielectric layer 2 is a layer that can be formed by electrolytic oxidation of the surface of the anode conductor 1, and is also formed in pore portions of a sintered body or a porous material. The thickness of the dielectric layer 2 can be appropriately adjusted by the voltage of electrolytic oxidation.

The solid electrolyte layer 3 includes the above electric conductive polymer suspension or the electric conductive organic material. The solid polymer electrolyte layer 3 may be provided with a monolayer structure or a multilayer structure. In the solid electrolytic capacitor illustrated in FIG. 1, the solid polymer electrolyte layer 3 includes a first electric conductive polymer compound layer 3A and a second electric conductive polymer compound layer 3B.

The solid electrolyte layer 3 may further contain an electric conductive polymer obtained by polymerization of pyrrole, thiophene, aniline, or a derivative thereof; an oxide derivative such as manganese dioxide or ruthenium oxide; or an organic semiconductor such as a TCNQ (7,7,8,8-tetracyanoquinodimethane complex salt).

Examples of a method for forming the solid electrolyte layer 3 include a method comprising coating or impregnating the dielectric layer 2 with the above-described electric conductive polymer suspension, and removing the solvent from the electric conductive polymer suspension. In addition, the solid electrolyte layer 3 in the solid electrolytic capacitor illustrated in FIG. 1 can be formed by a method including performing chemical oxidative polymerization or electropolymerization of a monomer for providing a first electric conductive polymer compound to form a first electric conductive polymer compound layer 3A on the dielectric layer, and coating or impregnating the first electric conductive polymer compound layer 3A with the above electric conductive polymer suspension to form a second electric conductive polymer compound layer on the first electric conductive polymer compound layer 3A.

As the monomer for providing a first electric conductive polymer compound, at least one selected from pyrrole, thiophene, aniline, and derivatives thereof can be used. As the dopant for use upon chemical oxidative polymerization or electropolymerization of the monomer to obtain a first electric conductive polymer compound, sulfonic acid-based compounds such as benzenesulfonic acid, naphthalenesulfonic acid, phenolsulfonic acid, styrenesulfonic acid, and derivatives thereof are preferable. The molecular weight of the dopant that can be used is appropriately selected within the range from low molecular weight to high molecular weight. The solvent may be only water, or may be a mixed solvent of water and an organic solvent soluble in water.

The coating or impregnating method is not particularly limited, but the electric conductive polymer suspension is preferably left to stand for several minutes to several ten minutes after the coating or impregnating in order to allow the electric conductive polymer suspension to be sufficiently packed into the pores of the porous material. The method is preferably performed by repeating of immersing, or by a pressure reduction system or a pressurization system.

The removal of the solvent from the electric conductive polymer suspension can be performed by drying the electric conductive polymer. The drying temperature is not particularly limited as long as it is a temperature that enables to remove the solvent, but the upper limit temperature is preferably less than 300° C. from the viewpoint of preventing an element from being degraded by heat. The dying time is required to be appropriately optimized depending on the drying temperature, but is not particularly limited as long as conductivity is not impaired.

The cathode conductor 4 is not particularly limited as long as it is a conductor. For example, the cathode conductor 4 can be provided with a two-layer structure including a carbon layer 5 such as graphite and a silver-electric conductive resin 6.

EXAMPLES

Hereinafter, the present embodiment will be described in detail based on Examples, but the present embodiment is not intended to be limited only to these Examples.

Example 1

(First Step)

3,4-Ethylenedioxy thiophene (2 g) as a monomer, camphorsulfonic acid (2 g) as a dopant, and iron (III) p-toluenesulfonate (18 g) as both of an oxidant and a dopant were dissolved in ethanol (60 ml) as a solvent. The resulting solution was stirred under room temperature for 24 hours to perform oxidative polymerization of the monomer. During this, the color of the mixed liquid was changed from yellow to dark blue.

(Second Step)

The mixed liquid obtained in the first step was filtrated by a reduced-pressure filtration apparatus to recover a powder. The resulting powder was washed with pure water to remove excess amounts of the oxidant and dopant. The washing with pure water was repeatedly performed until the pH of the filtrate reached 6 to 7. After the pH of the filtrate reached 6 to 7, the powder was further washed with ethanol to remove the monomer, the oxidant, and the oxidant (iron (II) p-toluenesulfonate) after the reaction. The washing with ethanol was performed until the color of the filtrate was turned to be colorless and transparent.

(Third Step)

The powder (1 g) washed in the second step was dispersed in water (200 ml), and then a 20% by weight aqueous solution (0.5 g) of polystyrene sulfonic acid as a polyacid (polyanion) (weight average molecular weight: 50,000) was added thereto. To the mixed liquid was further added ammonium persulfate (1.5 g) as an oxidant, and stirred under room temperature for 24 hours. The color of the resulting polythiophene suspension was navy blue.

(Fourth Step)

A dispersant having a branched structure (DISPERBYK (R)-190, 40% by weight aqueous solution, BYK-Chemie GmbH) (3 g) was added to the mixed liquid obtained in the third step, and stirred under room temperature for 1 hour to be completely dissolved. Thereafter, particles in the mixed liquid were pulverized by using a bead mill to adjust the average particle size to 500 nm. The color of the resulting polythiophene suspension was kept navy blue.

A dynamic light scattering method (measuring apparatus: Zeta-potential & Particle Size Analyzer ELSZ-2 (Otsuka Electronics Co., Ltd.)) was used for measuring the average particle size.

(Evaluation of Polythiophene Suspension)

The resulting polythiophene suspension was dropped on a glass substrate in an amount of 100 µl, and the solvent thereof was completely volatilized to be dried in a constant-temperature bath at 125° C. to form an electric conductive polymer film.

The surface resistance (0/sq) and the thickness of the resulting electric conductive polymer film were measured by a four-terminal method to calculate conductivity (S/cm).

Example 2

A polythiophene suspension was produced in the same manner as in Example 1 except that in the third step, the amount of the 20% by weight aqueous solution of polystyrene sulfonic acid (weight average molecular weight: 50,000) added was changed to 5 g, and in the fourth step, the amount of the dispersant with a branched structure (DISPERBYK (R)-190, 40% by weight aqueous solution, BYK-Chemie GmbH) added was changed to 0.2 g. Then, an electric conductive polymer film was formed in the same manner as in Example 1 except that the resulting polythiophene suspension was used, and the conductivity thereof was evaluated. The result is shown in Table 1.

Example 3

A polythiophene suspension was produced in the same manner as in Example 1 except that in the third step, the amount of the 20% by weight aqueous solution of polystyrene sulfonic acid (weight average molecular weight: 50,000) added was changed to 10 g, and in the fourth step, the amount of the dispersant with a branched structure (DISPERBYK (R)-190, 40% by weight aqueous solution, BYK-Chemie GmbH) added was changed to 0.04 g. Then, an electric conductive polymer film was formed in the same manner as in Example 1 except that the resulting polythiophene suspension was used, and the conductivity thereof was evaluated. The result is shown in Table 1.

Example 4

A polythiophene suspension was produced in the same manner as in Example 2 except that in the third step, a polystyrene sulfonic acid with a weight average molecular weight of 2,000 was used as the polyacid. Then, an electric conductive polymer film was formed in the same manner as in Example 1 except that the resulting polythiophene suspension was used, and the conductivity thereof was evaluated. The result is shown in Table 1.

Example 5

A polythiophene suspension was produced in the same manner as in Example 1 except that in the fourth step, particles in the mixed liquid were pulverized by using a bead mill to adjust the average particle size to 50 nm. Then, an electric conductive polymer film was formed in the same manner as in Example 1 except that the resulting polythiophene suspension was used, and the conductivity thereof was evaluated. The result is shown in Table 1.

Example 6

A polythiophene suspension was produced in the same manner as in Example 2 except that in the fourth step, particles in the mixed liquid were pulverized by using a bead mill to adjust the average particle size to 50 nm. Then, an electric conductive polymer film was formed in the same manner as in Example 1 except that the resulting polythiophene suspension was used, and the conductivity thereof was evaluated. The result is shown in Table 1.

Example 7

A polythiophene suspension was produced in the same manner as in Example 3 except that in the fourth step, particles in the mixed liquid were pulverized by using a bead mill to adjust the average particle size to 50 nm. Then, an electric conductive polymer film was formed in the same manner as in Example 1 except that the resulting polythiophene suspension was used, and the conductivity thereof was evaluated. The result is shown in Table 1.

Example 8

A polythiophene suspension was produced in the same manner as in Example 2 except that after the fourth step, a water-soluble polyester (PESRESIN A-610, 25% by weight aqueous solution, Takamatsu Oil & Fat Co., Ltd.) (8 g) was added and stirred under room temperature for 1 hour to be completely dissolved. Then, an electric conductive polymer film was formed in the same manner as in Example 1 except that the resulting polythiophene suspension was used, and the conductivity thereof was evaluated. The result is shown in Table 1.

Example 9

A polythiophene suspension was produced in the same manner as in Example 2 except that after the fourth step, a step of adding a water-soluble polyamide (AQ Nylon P-95, 50% by weight aqueous solution, Toray Industries Inc.) (4 g), and stirring it under room temperature for 1 hour to completely dissolve it was added. Then, an electric conductive polymer film was formed in the same manner as in Example 1 except that the resulting polythiophene suspension was used, and the conductivity thereof was evaluated. The result is shown in Table 1.

Example 10

A polythiophene suspension was produced in the same manner as in Example 2 except that after the fourth step, a step of adding a water-soluble polyester (PESRESIN A-610, 25% by weight aqueous solution, Takamatsu Oil & Fat Co., Ltd.) (8 g) and erythritol (10 g), and stirring them under room temperature for 1 hour to completely dissolve them was added. Then, an electric conductive polymer film was formed in the same manner as in Example 1 except that the resulting polythiophene suspension was used, and the conductivity thereof was evaluated. The result is shown in Table 1.

Example 11

A polythiophene suspension was produced in the same manner as in Example 2 except that after the fourth step, a step of adding a water-soluble polyester (PESRESIN A-610, 25% by weight aqueous solution, Takamatsu Oil & Fat Co., Ltd.) (8 g) and pentaerythritol (10 g), and stirring them under room temperature for 1 hour to completely dissolve them was added. Then, an electric conductive polymer film was formed in the same manner as in Example 1 except that the resulting polythiophene suspension was used, and the conductivity thereof was evaluated. The result is shown in Table 1.

Example 12

A polythiophene suspension was produced in the same manner as in Example 6 except that after the fourth step, a step of adding a water-soluble polyester (PESRESIN A-610, 25% by weight aqueous solution, Takamatsu Oil & Fat Co., Ltd.) (8 g), and stirring it under room temperature for 1 hour to completely dissolve it was added. Then, an electric conductive polymer film was formed in the same manner as in Example 1 except that the resulting polythiophene suspension was used, and the conductivity thereof was evaluated. The result is shown in Table 1.

Example 13

A polythiophene suspension was produced in the same manner as in Example 6 except that after the fourth step, a step of adding a water-soluble polyamide (AQ Nylon P-95, 50% by weight aqueous solution, Toray Industries Inc.) (4 g), and stirring it under room temperature for 1 hour to completely dissolve it was added. Then, an electric conductive polymer film was formed in the same manner as in Example 1 except that the resulting polythiophene suspension was used, and the conductivity thereof was evaluated. The result is shown in Table 1.

Example 14

A polythiophene suspension was produced in the same manner as in Example 6 except that after the fourth step, a step of adding a water-soluble polyester (PESRESIN A-610, 25% by weight aqueous solution, Takamatsu Oil & Fat Co., Ltd.) (8 g) and erythritol (10 g), and stirring them under room temperature for 1 hour to completely dissolve them was added. Then, an electric conductive polymer film was formed in the same manner as in Example 1 except that the resulting polythiophene suspension was used, and the conductivity thereof was evaluated. The result is shown in Table 1.

Example 15

A polythiophene suspension was produced in the same manner as in Example 6 except that after the fourth step, a step of adding a water-soluble polyester (PESRESIN A-610, 25% by weight aqueous solution, Takamatsu Oil & Fat Co., Ltd.) (8 g) and pentaerythritol (10 g), and stirring them under room temperature for 1 hour to completely dissolve them was added. Then, an electric conductive polymer film was formed in the same manner as in Example 1 except that the resulting polythiophene suspension was used, and the conductivity thereof was evaluated. The result is shown in Table 1.

Comparative Example 1

A polythiophene suspension was produced by the method described in Example 1 of Patent Literature 1. Specifically, a polystyrene sulfonic acid with a weight average molecular weight of 4,000 (2 g), 3,4-ethylenedioxy thiophene (0.5 g)

and iron (III) sulfate (0.05 g) were dissolved in water (20 ml), and air was introduced thereto over 24 hours to produce a polythiophene suspension.

An electric conductive polymer film was formed in the same manner as in Example 1 except that the resulting polythiophene suspension was used, and the conductivity thereof was evaluated. The result is shown in Table 1.

Comparative Example 2

A polystyrene sulfonic acid with a weight average molecular weight of 4,000 (12.4 g), 3,4-ethylenedioxy thiophene (1.6 g) and iron (III) sulfate (0.16 g) were dissolved in water (1000 ml), and air was introduced thereto over 24 hours to produce a polythiophene suspension. Thereafter, the polythiophene suspension was homogenized twice by using a high pressure homogenizer at 700 bar and at a nozzle diameter of 0.1 mm. The average particle size of particles in the aqueous solution was 20 nm.

An electric conductive polymer film was formed in the same manner as in Example 1 except that the resulting polythiophene suspension was used, and the conductivity thereof was evaluated. The result is shown in Table 1.

Example 16

A porous aluminum material was used as an anode conductor including a valve metal, and an oxide film serving as a dielectric layer was formed on the surface of the porous aluminum material by anodic oxidation. An anode section and a cathode section were partitioned by an insulating resin. Then, the cathode section of the anode conductor, on which the dielectric layer was formed, was immersed in and pulled up from the polythiophene suspension produced in Example 2, and then dried and solidified in a constant-temperature bath at 125° C. to form a solid electrolyte layer. Then, a graphite layer and a silver-containing resin layer were sequentially formed on the solid electrolyte layer to prepare a solid electrolytic capacitor.

The capacitance and ESR (equivalent series resistance) of the resulting solid electrolytic capacitor were measured by using an LCR meter at frequencies of 120 Hz and 100 kHz, respectively. The capacitance and ESR values were normalized from those of the total cathode section area to those of the unit area (1 cm$^2$). The results are shown in Table 2.

Example 17

A solid electrolytic capacitor was produced in the same manner as in Example 16 except that the polythiophene suspension produced in Example 10 was used for forming a solid electrolyte layer, and the capacitance and ESR thereof were evaluated. The results are shown in Table 2.

Example 18

A solid electrolytic capacitor was produced in the same manner as in Example 16 except that the polythiophene suspension produced in Example 14 was used for forming a solid electrolyte layer, and the capacitance and ESR thereof were evaluated. The results are shown in Table 2.

Example 19

A porous aluminum material was used as an anode conductor including a valve metal, and an oxide film serving as a dielectric layer was formed on the surface of the porous aluminum material by anodic oxidation. An anode section and a cathode section were partitioned by an insulating resin. Then, the cathode section of the anode conductor, on which the dielectric layer was formed, was repeatedly immersed in and pulled up from a monomer liquid, in which pyrrole (10 g) was dissolved in pure water (200 ml), and an oxidant liquid, in which p-toluenesulfonic acid (20 g) as a dopant and ammonium persulfate (10 g) as an oxidant were dissolved in pure water (200 ml), in sequence, ten times to perform chemical oxidative polymerization, thereby forming a first electric conductive polymer compound layer.

The polythiophene suspension produced in Example 10 was dropped on the first electric conductive polymer compound layer and then dried and solidified in a constant-temperature bath at 125° C. to form a second electric conductive polymer compound layer. Then, a graphite layer and a silver-containing resin layer were sequentially formed on the solid electrolyte layer including the first electric conductive polymer compound layer and the second electric conductive polymer compound layer, to produce a solid electrolytic capacitor.

The capacitance and ESR of the solid electrolytic capacitor obtained were evaluated in the same manner as in Example 16. The results are shown in Table 2.

Example 20

A solid electrolytic capacitor was produced in the same manner as in Example 19 except that the polythiophene suspension produced in Example 14 was used for forming a solid electrolyte layer. The capacitance and ESR of the solid electrolytic capacitor obtained were evaluated in the same manner as in Example 16. The results are shown in Table 2.

Comparative Example 3

A solid electrolytic capacitor was produced in the same manner as in Example 16 except that the polythiophene suspension produced in Comparative Example 1 was used instead of the polythiophene suspension produced in Example 2. The capacitance and ESR of the solid electrolytic capacitor obtained were evaluated in the same manner as in Example 16. The results are shown in Table 2.

Comparative Example 4

A solid electrolytic capacitor was produced in the same manner as in Example 16 except that the polythiophene suspension produced in Comparative Example 2 was used instead of the polythiophene suspension produced in Example 2. The capacitance and ESR of the solid electrolytic capacitor obtained were evaluated in the same manner as in Example 16. The results are shown in Table 2.

TABLE 1

| | Ratio to 100 parts by weight of electric conductive polymer | | | | |
|---|---|---|---|---|---|
| | Polyanion (parts by weight) | Dispersant with branched structure (parts by weight) | Other substance mixed | Average particle size (nm) | Conductivity (S/cm) |
| Example 1 | 10 | 120 | — | 500 | 280 |
| Example 2 | 100 | 8 | — | 500 | 410 |
| Example 3 | 200 | 1 | — | 500 | 320 |
| Example 4 | 100 | 8 | — | 500 | 370 |
| Example 5 | 10 | 120 | — | 50 | 250 |
| Example 6 | 100 | 8 | — | 50 | 395 |
| Example 7 | 200 | 1 | — | 50 | 290 |
| Example 8 | 100 | 8 | Water-soluble polyester | 500 | 400 |
| Example 9 | 100 | 8 | Water-soluble polyamide | 500 | 385 |
| Example 10 | 100 | 8 | Water-soluble polyester and Erythritol | 500 | 420 |
| Example 11 | 100 | 8 | Water-soluble polyester and Pentaerythritol | 500 | 395 |
| Example 12 | 100 | 8 | Water-soluble polyester | 50 | 380 |
| Example 13 | 100 | 8 | Water-soluble polyamide | 50 | 365 |
| Example 14 | 100 | 8 | Water-soluble polyester and Erythritol | 50 | 400 |
| Example 15 | 100 | 8 | Water-soluble polyester and Pentaerythritol | 50 | 380 |
| Comparative Example 1 | 400 | 0 | — | 500 | 95 |
| Comparative Example 2 | 800 | 0 | — | 20 | $1.0 \times 10^{-4}$ |

In Table 1, in the case where the average particle size was 500 nm, no particle whose size was 100 nm or less, was included.

TABLE 2

| | Capacitance ($\mu F \cdot cm^2$) | ESR ($m\Omega \cdot cm^2$) |
|---|---|---|
| Example 16 | 201 | 1.4 |
| Example 17 | 203 | 1.2 |
| Example 18 | 219 | 1.3 |
| Example 19 | 207 | 1.3 |
| Example 20 | 211 | 1.2 |
| Comparative Example 3 | 200 | 3.5 |
| Comparative Example 4 | 209 | $1.8 \times 10^3$ |

As shown in Table 1, the conductivity of each of the electric conductive polymer films obtained in Examples 1 to 15 was higher than that of each of the electric conductive polymer films obtained in Comparative Examples 1 and 2. That is, the effect of increasing conductivity according to the present embodiment is remarkable. In particular, even in the case where the particle size of the electric conductive polymer in the electric conductive polymer suspension is partially or entirely 100 nm or less (in the case where the average particle size is 50 nm), an electric conductive polymer film with a high conductivity is obtained and its effects are remarkable.

The effect of increasing conductivity is due to the following: the electric conductive polymer suspension according to the present embodiment contains an electric conductive polymer, at least one polyanion, and at least one dispersant with a branched structure.

According to the above composition, the electric conductive polymer suspension is excellent in dispersing stability of particles contained therein. Therefore, a polyanion, which is not used as the dopant and does not contribute to conductivity, can be reduced with respect to the electric conductive polymer, and an electric conductive organic material obtained from the electric conductive polymer suspension is high in conductivity.

The conductivity of each of the electric conductive polymer films obtained in Examples 2, 4, 6, and 8 to 15 was higher than that of each of the electric conductive polymer films obtained in Examples 1, 3, 5 and 7. The reason for this is because the ratio of the polyanion and the dispersant with a branched structure to the electric conductive polymer contained in each of the electric conductive polymer suspensions of Examples 2, 4, 6, and 8 to 15 is lower than that in each of the electric conductive polymer suspensions of Example 1, 3, 5 and 7.

In addition, the method for producing an electric conductive polymer suspension undergoes the first step to the third step, and thereby (1) choices of the dopant are expanded to enable to select a dopant for increasing a degree of crystallization, (2) a solvent composition with high compatibility with the monomer can be selected to enable to increase a degree of polymerization, and (3) easiness of washing can increase purity to result in an increase in conductivity.

Furthermore, erythritol is added during or after the fourth step to thereby improve conductivity. The reason for this is because erythritol interacts with the anion, which is not used as the dopant (as the resistance component), and which is present in the vicinity of electric conductive polymer particles in the electric conductive polymer suspension and is charged in the third step, to thereby decrease the resistance between the electric conductive polymer particles and increase the density of the electric conductive polymer.

Even if a water-soluble binder including a polyester or a polyamide is added during or after the fourth step, conductivity is mostly not impaired.

As shown in Table 2, the resistance (ESR) of each of the solid electrolytic capacitors obtained in Examples 16 to 20 was lower than that of each of the solid electrolytic capacitors obtained in Comparative Examples 3 to 4. In each of Examples 16 to 20, the conductivity of the electric conductive organic material used is high. Therefore, the resistance of a solid electrolyte can be reduced and the resistance (ESR) can be also reduced. Even in the case where the particle size of the electric conductive polymer in the electric conductive polymer suspension is partially or entirely 100 nm or less, a solid electrolytic capacitor low in resistance (ESR) is obtained, and, thus, the effects are remarkable. In addition, the electric conductive polymer suspension, in which the particle sizes of the electric conductive polymer are partially or entirely 100 nm or less, is suitable for forming the electric conductive organic material in the pores of a porous material as an anode conductor comprising a valve metal, and is excellent in capacitance appearance.

REFERENCE SIGNS LIST 1 anode conductor
2 dielectric layer
3 solid electrolyte layer
3A first electric conductive polymer compound layer
3B second electric conductive polymer compound layer
4 cathode conductor
5 carbon layer
6 silver-electric conductive resin layer

The invention claimed is:

1. An electric conductive polymer suspension comprising an electric conductive polymer, at least one polyanion, and at least one dispersant with a branched structure,
wherein the electric conductive polymer comprises an electric conductive polymer with a particle size of 100 nm or less; and
wherein the dispersant with a branched structure comprises a structure bearing an adsorption group for adsorption to the electric conductive polymer in a main chain, and bearing one or more hydrophilic and/or hydrophobic side chains.

2. The electric conductive polymer suspension according to claim 1, wherein the particle size of the electric conductive polymer is 100 nm or less.

3. The electric conductive polymer suspension according to claim 1, wherein the amount of the polyanion is 10 to 200 parts by weight, and the amount of the dispersant with a branched structure is 1 to 120 parts by weight, with respect to 100 parts by weight of the electric conductive polymer.

4. The electric conductive polymer suspension according to claim 1, wherein the electric conductive polymer is a polymer including at least one of pyrrole, thiophene, and derivatives thereof.

5. The electric conductive polymer suspension according to claim 1, containing polystyrene sulfonic acid as the polyanion.

6. The electric conductive polymer suspension according to claim 5, wherein the weight average molecular weight of the polystyrene sulfonic acid is 2,000 to 500,000.

7. The electric conductive polymer suspension according to claim 1, comprising at least one water-soluble binder.

8. The electric conductive polymer suspension according to claim 7, wherein the water-soluble binder is at least one of polyester and polyamide.

9. The electric conductive polymer suspension according to claim 7, wherein the amount of the at least one water-soluble binder is 10 to 400 parts by weight with respect to 100 parts by weight of the electric conductive polymer.

10. The electric conductive polymer suspension according to claim 1, comprising erythritol and/or pentaerythritol.

* * * * *